United States Patent [19]

Nguyen

[11] Patent Number: 5,355,073

[45] Date of Patent: Oct. 11, 1994

[54] BATTERY PACK SENSOR FOR AN AC ADAPTER

[75] Inventor: Hai N. Nguyen, Spring, Tex.

[73] Assignee: Compaq Computer Corporation, Houston, Tex.

[21] Appl. No.: 954,008

[22] Filed: Sep. 30, 1992

[51] Int. Cl.$^5$ ............................ H01M 10/44; H02J 7/00
[52] U.S. Cl. ..................................... 320/15; 320/22; 320/31; 320/39
[58] Field of Search ................... 320/6, 15, 22, 23, 24, 320/31, 32, 39, 40

[56] References Cited

U.S. PATENT DOCUMENTS

| | | | |
|---|---|---|---|
| 3,652,915 | 3/1972 | Eberts | 320/31 |
| 4,006,397 | 2/1977 | Catotti et al. | 320/31 |
| 4,061,956 | 12/1977 | Brown et al. | 320/22 |
| 4,118,661 | 10/1978 | Siekierski et al. | 320/40 |
| 4,209,736 | 6/1980 | Reidenbach | 320/22 |
| 4,225,815 | 9/1980 | Lind et al. | 320/39 |
| 4,371,826 | 2/1983 | Shelly | 320/32 X |
| 4,392,101 | 7/1983 | Saar et al. | 320/39 X |
| 4,418,310 | 11/1983 | Bollinger | 320/39 |
| 4,433,277 | 2/1984 | Carollo et al. | 320/24 |
| 4,455,523 | 6/1984 | Koenck | 320/39 X |
| 4,553,081 | 11/1985 | Koenck | 320/39 X |
| 4,609,860 | 9/1986 | Fasen | 320/39 X |
| 4,629,965 | 12/1986 | Fallon et al. | 320/39 |
| 4,670,703 | 6/1987 | Williams | 320/22 |
| 4,677,363 | 6/1987 | Kopmann | 320/32 X |
| 4,709,202 | 11/1987 | Koenck et al. | 320/39 X |
| 4,746,854 | 5/1988 | Baker et al. | 320/40 |
| 4,767,977 | 8/1988 | Fasen et al. | 320/23 X |
| 4,792,743 | 12/1988 | Tsujino et al. | 320/15 |
| 4,820,965 | 4/1989 | Siemer | 320/31 |
| 4,843,299 | 6/1989 | Hutchings | 320/31 |
| 4,918,368 | 4/1990 | Baker et al. | 320/40 |
| 4,947,123 | 8/1990 | Minezawa | 324/427 |
| 4,961,043 | 10/1990 | Koenck | 320/40 X |
| 5,049,804 | 9/1991 | Hutchings | 320/23 X |
| 5,121,047 | 6/1992 | Goedken et al. | 320/15 X |
| 5,122,722 | 6/1992 | Goedken et al. | 320/22 |
| 5,162,719 | 11/1992 | Tomura et al. | 320/15 X |
| 5,184,059 | 2/1993 | Patino et al. | 320/15 |
| 5,187,422 | 2/1993 | Izenbaard et al. | 320/15 X |

FOREIGN PATENT DOCUMENTS

| | | |
|---|---|---|
| 3901096 | 8/1989 | Fed. Rep. of Germany . |
| 63-316643 | 12/1988 | Japan . |
| 0616688 | 6/1978 | U.S.S.R. . |
| 1190429 | 11/1985 | U.S.S.R. . |
| 2226715 | 7/1990 | United Kingdom ............. 320/15 |

Primary Examiner—Kristine L. Peckman
Attorney, Agent, or Firm—Pravel, Hewitt, Kimball & Krieger

[57] ABSTRACT

An AC adapter including an automatic battery voltage selection circuit that senses which battery pack is installed in an electronic device and regulates the AC adapter output voltage at an appropriate level. A battery voltage selection signal providing circuit provides the battery voltage selection signal indicative of the particular battery pack present. An output voltage sensor senses the output voltage of the AC adapter and provides a proportional sense signal to a feedback circuit which controls the AC adapter output. A switching circuit coupled to the output voltage sensor and to the battery voltage selection signal providing circuit modifies the sense signal depending upon the state of the battery voltage selection signal, so that the AC adapter output voltage is regulated at an appropriate level for the particular battery pack installed. If a first battery pack is installed, the AC adapter regulates the output voltage at a first level and if a second battery pack is installed, the AC adapter output voltage is regulated at a second, higher voltage level. The switching circuit is preferably implemented with a transistor switching circuit.

39 Claims, 4 Drawing Sheets

BATTERY PACK SENSOR FOR AN AC ADAPTER

BACKGROUND OF THE INVENTION

1. Field of the Invention

The present invention relates to an AC adapter which includes an apparatus which senses which one of two different battery packs is installed and regulates the AC adapter output voltage at a level appropriate for the installed battery pack. 2. Description of the Related Art Many electronic devices such as portable computers are powered either through an AC line or a rechargeable battery. The battery is typically provided in a removable battery pack which could include other components, although these other components will not be discussed further for purposes of simplification, the battery will generally be referred to as a battery pack. In such devices, an AC adapter is typically provided to convert the AC line voltage to a DC voltage to provide power to the device and to charge the battery pack. The voltage of a rechargeable battery pack varies depending upon its charge so that it is convenient that the DC voltage provided by the AC adapter be allowed to vary within a certain predetermined range based on the voltage range of the battery pack. Due to the flexibility of many electronic devices which can receive a DC voltage which ranges in value and use a DC-DC convertor to develop the final desired voltage, it is desirable to power the electronic device with at least two different battery packs each having a different number of cells and thus a different voltage. The AC adapter, however, typically has one output which is dedicated to a particular battery pack with a fixed number of battery cells so that it may not be used for a different battery pack.

One solution which has been proposed is to provide an AC adapter with at least two separate charger outputs, each output dedicated to a particular battery pack. There are a number of difficulties with this approach, including duplication of circuitry and consumption of significant amounts of valuable circuit board space, thereby resulting in a significantly more expensive design. Furthermore, an AC adapter simultaneously providing two separate outputs is difficult to design due to loop compensation problems.

It is, therefore, desirable to provide an AC adapter which senses which battery pack is coupled to the system and provides an appropriate output voltage compatible with the connected battery pack.

SUMMARY OF THE PRESENT INVENTION

An AC adapter including an automatic battery voltage selection circuit according to the present invention senses which battery pack is installed and regulates the output voltage of the AC adapter at a corresponding level. An AC adapter typically includes a power source or converter for converting an AC input voltage to a DC output voltage, and a voltage sensing means coupled to the output to sense the output voltage and provide a proportional sense signal to a feedback circuit. The feedback circuit typically includes means such as a comparator for comparing the sense signal with a predetermined reference voltage thus providing a feedback signal used to regulate the output of the AC adapter.

An automatic battery selection circuit according to the present invention detects which one of two battery packs is installed in the device and regulates the output voltage at an appropriate level for that battery pack. A means provides a battery voltage selection (BVS) signal indicative of the installed battery pack. A switching means, receiving the BVS signal and coupled to the AC adapter voltage sensing means, modifies the sense signal to regulate the AC adapter output voltage at the appropriate level for whichever battery pack is installed as indicated, by the BVS signal.

In the preferred embodiment, the output voltage sensing means comprises a resistive voltage divider having a junction providing the sense signal to regulate the output voltage at an appropriate level for charging one of the battery packs. One of the battery packs preferably includes a jumper having a first terminal for coupling to the battery voltage selection means and a second terminal. The second terminal of the jumper may either be coupled to ground through the battery voltage selecting means, or to the positive terminal of the battery pack, which is coupled to the output of the AC adapter when that battery pack is installed. The switching means preferably includes a resistor having one side coupled to the sense signal junction and the other side coupled directly to receive the battery voltage selection circuit or coupled indirectly through a transistor switch circuit. In either case, the second side of the resistor is open circuited when one of the battery packs is installed, and either grounded or coupled to the output of the AC adapter, depending upon the specific embodiment, when the other battery pack is installed. Thus, in the preferred embodiment, the additional resistor is coupled in or out of the output voltage sensing means to modify the sense signal.

An automatic battery voltage selection circuit according to the present invention is relatively simple, efficient, and cost effective and does not affect the loop compensation of the feedback of the AC adapter allowing for ease of design. Thus, the present invention allows two different battery packs to be used to power an electronic device.

BRIEF DESCRIPTION OF THE DRAWINGS

A better understanding of the present invention can be obtained with the following detailed description of the preferred embodiment is considered in conjunction with the following drawings, in which.

DETAILED DESCRIPTION OF THE PREFERRED EMBODIMENT

Figure 1A:
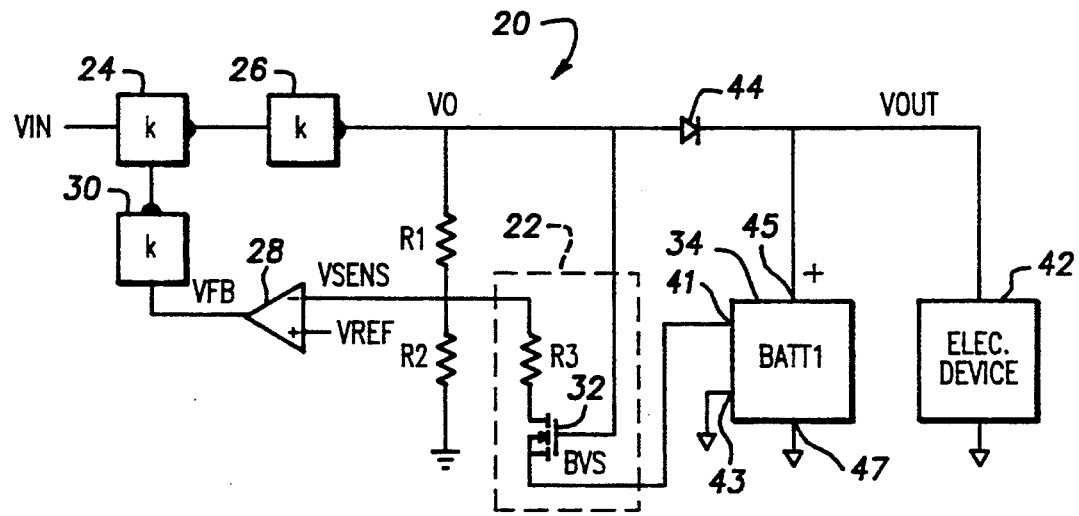
FIGS. 1A and 1B are simplified schematic diagrams of a typical control loop of an AC adapter coupled to an electronic device, a first battery pack or a second battery pack, respectively, and an automatic battery voltage selection circuit according to the present invention.

Referring now to FIG. 1A, a simplified diagram of an AC adaptor 20 used to charge a first battery pack 34 and to provide power to an electronic device 42 is shown coupled to one embodiment of an automatic battery voltage selection circuit 22 according to the present invention. The input voltage from an AC line, referred to as VIN, is coupled to the input of a gain block 24 which may include an input filter rectifier and possibly the primary of a transformer (not shown). The particular details of the implementation of the AC adapter 20 are not described as the present invention can be practiced with a variety of implementations of the AC adapter 20. The gain block 24 provides a signal to an input of a gain block 26 which could comprise a secondary of the transformer and an output filter to provide an output signal referred to as VO.

A resistor R1 is coupled between the VO signal and a signal VSENS and a resistor R2 is coupled between the VSENS signal and ground. In this manner, the resistors R1 and R2 form a voltage divider which senses the VO signal and provides the VSENS signal which has a voltage level indicative of the VO signal. A comparator 28 has its inverting input connected to the VSENS signal and its non-inverting input connected to a signal VREF, which has a known voltage level which is preferably 2.5 volts. The comparator 28 provides a signal VFB at its output which is connected to a gain block 30. The gain block 30 may comprise a pulse width modulation (PWM) circuit which may be used to control the feedback loop of the AC adapter 20. The gain block 30 provides a signal to the gain block 24 to complete the feedback loop. In this manner, the feedback loop, comprising the gain blocks 24, 26 and 30, the resistors R1 and R2, and the comparator 28, regulates the VO signal at a first level so that the VSENS and VREF signals are approximately equivalent. Thus, as the VO signal changes, the VSENS signal changes correspondingly so that the comparator 28 manipulates the VFB signal to oppose the changes of the VO signal. The AC adapter 20 is essentially a power source or converter which converts an AC voltage to a first DC voltage appropriate for the battery pack 34 and the electronic device 42.

The automatic battery voltage selection circuit 22 includes a resistor R3 having one side connected to the VSENS signal and the other side connected to the drain terminal of an n-channel metal-oxide semiconductor field-effect-transistor (MOSFET) 32. The gate terminal of the MOSFET 32 is connected to the VO signal and its source terminal is connected to a signal referred to as BVS (battery voltage selection). The VO signal is also connected to the anode of a diode 44 and the cathode of the diode 44 provides a signal referred to as VOUT which is connected to the positive terminal of the battery pack 34. The negative terminal of the battery pack 34 is coupled to ground. The battery pack 34 may preferably comprise other components such as a temperature sensor, a current limiter, discharge diodes and other components, but these other components are not shown for purposes of simplification. The electronic device 42 is coupled between the VOUT signal and ground. The VOUT signal essentially follows the voltage level of the VO signal minus the forward drop across the diode 44 when the VIN signal is connected to the AC adapter 20. If the VIN signal is not connected, the VO signal goes low and the diode 44 isolates the battery pack 34 from the AC adapter 20.

It is noted that the battery pack 34 is removably connected to the electronic device 42 allowing for a different battery to be installed in its place. In practice, an appropriate receptacle (not shown) would be provided in the electronic device 42 to receive the battery pack 34 or another battery pack 38. The AC adapter 20 is also preferably removably connected to the electronic device 42 through a cable comprising wires appropriate to carry the necessary signals. The receptacle has four terminals 41, 43, 45 and 47 to couple to appropriate locations of the battery pack 34. The BVS signal is connected to the terminal 41 and the terminal 43 is connected to ground although the battery pack 34 does not include corresponding connection points. The terminal 41, therefore, is left open circuited indicating that the battery pack 34 is installed since the BVS signal is also open circuited. Of course, if no battery is installed on the AC adapter 20, the BVS signal is still left open circuited.

The positive terminal of the battery pack 34 is coupled to the terminal 45 which is coupled to the VOUT signal, and the negative terminal of the battery pack 34 is connected to the terminal 47. The battery pack 34 is one of two different types of battery packs that may be connected to the electronic device 42, each having a different number of cells and a different nominal voltage level. The first battery pack 34 preferably has 10 cells of approximately 1.2 volts each for a nominal voltage of 12 volts.

If the battery pack 34 is connected to the electronic device 42 and the AC adapter 20 is also connected, the BVS signal is open circuited, thereby switching off the MOSFET 32 so that the automatic battery voltage selection circuit 22 has little or no effect on the operation of the AC adapter 20. Thus, the resistors R1 and R2 are chosen to provide a VSENS signal to regulate the VO signal at a first voltage level appropriate for the battery pack 34. This voltage is preferably approximately 18 volts, although the VO signal typically varies between 10 and 18 volts if the battery pack 34 is installed. The actual level of the output voltage will vary depending upon the rate of charge or the current flowing through the battery pack 34, if installed, as well as the level of charge on the battery pack 34. For example, if the battery pack 34 is fully discharged and being charged at a fast rate, the VO signal may be pulled down to a couple of volts above the voltage of the battery pack 34 itself. If the battery pack 34 is fully charged and being trickle charged, the VO signal may rise to approximately 18 volts.

Figure 1B:
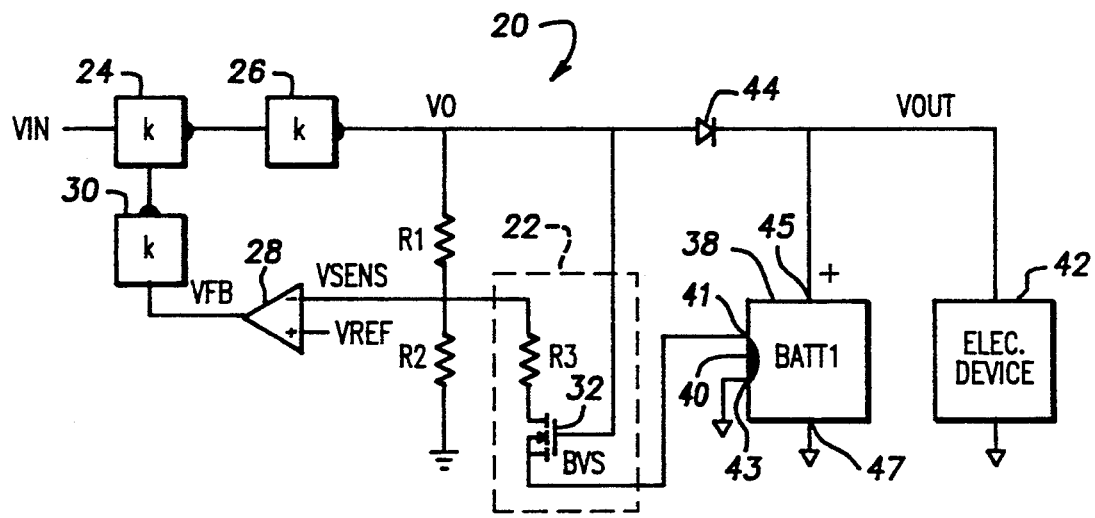

Referring now to Figure 1B, the same AC adapter 20 is shown which operates in a similar manner except that a different battery pack 38 is installed in the electronic device 42 rather than the battery pack 34. Like reference numerals are used on corresponding components. Again, the terminals 41, 43, 45 and 47 contact the appropriate points on the battery pack 38 as described previously for the battery pack 34. The battery pack 38 preferably has 16 cells for a nominal voltage of 19.2 volts. The battery pack 38 includes a jumper 40 which has its two terminals conductively shorted together so that if the battery pack 38 is installed in the AC adapter 20, the jumper 40 couples the terminal 41 to the terminal 43 so that the BVS signal is coupled to ground. The jumper 40 may be implemented in many different ways, as long as it provides a conductive path between the BVS signal and ground.

Another embodiment is contemplated where a physical switch is coupled between the terminals 41 and 43, replacing the jumper 40, so that the switch remains open when the battery pack 34 is installed and closed when the battery pack 38 is installed. In this case, a portion of the housing of the battery pack 38 contacts the switch, with the battery pack 34 housing having a recess at the switch location so that no contact is made. The function is very similar, but the jumper method is preferred.

Thus, the MOSFET 32 is switched on when the battery pack 38 is installed, thereby grounding the second terminal of the resistor R3. The voltage drop across the MOSFET 32 between the resistor R3 and BVS signal is considered negligible for purposes of this disclosure. When the BVS signal is grounded in this manner, the resistor R3 is placed in parallel with the resistor R2, thus changing the effective resistance between the VSENS signal and ground, thereby tending to lower its voltage. The AC adapter 20 responds by raising and regulating the VO signal at a second higher voltage level which is appropriate for the battery pack 38. This higher voltage level is preferably approximately 30 volts, although the voltage range of the AC adapter 20 may now preferably range between 16 to 30 volts, which is appropriate voltage range for the battery pack 38. Of course, the actual output voltage of the AC adapter 20 will vary depending upon the status of the battery pack 38 itself, as described above for the battery pack 34.

The first regulated voltage level of the VO signal appropriate for the battery pack 34, which is referred to as VO1, is determined by the following equation 1:

$$VO1 = \frac{R1}{R1 \| R2} VREF = \frac{R1 + R2}{R2} VREF \quad (1)$$

where the "//" symbol denotes resistors in parallel, and where the comparator 28 operates to keep the VSENS signal approximately equal to the VREF signal. If the battery pack 38 is installed, thereby grounding the BVS signal, the AC adapter 20 regulates the VO signal at a second voltage level, which is referred to as VO2, which is provided by the following equation 2:

$$VO2 = \frac{R1}{R1 \| R2 \| R3} VREF = \frac{R1R2 + R1R3 + R2R3}{R2R3} VREF \quad (2)$$

where "R1R2" indicates multiplication of the values of resistance of the resistors R1 and R2. Note that since the VREF signal is preferably constant, VO2 is greater than VO1 due to the decrease in resistance between the VSENS signal and ground.

Figure 2:
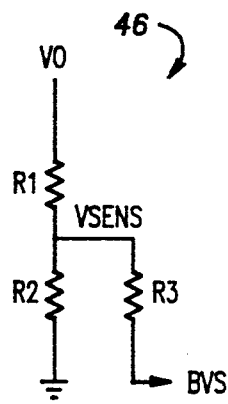
FIGS. 2 and 3 are schematic diagrams of other embodiments of an automatic battery voltage selection circuit according to the present invention for use in the AC adapter of FIGS. 1A and 1B.

Referring now to FIG. 2, a schematic diagram of an alternate embodiment of another automatic battery voltage selection circuit 46 according to the present invention is shown, which could be used in the AC adapter 20. The resistors R1 and R2 are not part of the circuit 46 but are included for clarity. Here, the circuit 46 comprises the resistor R3. Like reference designators are again used for similar components or elements. Again, the resisters R1 and R2 are coupled in series between the VO signal and ground and one side of the resister R3 is coupled to the VSENS signal. In this case, however, the other side of the resister R3 is connected directly to the BVS signal which is again either grounded or open circuited depending on whether the battery pack 34 or the battery pack 38 is installed in the electronic device 42. The AC adapter 20 thus operates in a very similar manner as described above.

Figure 3:
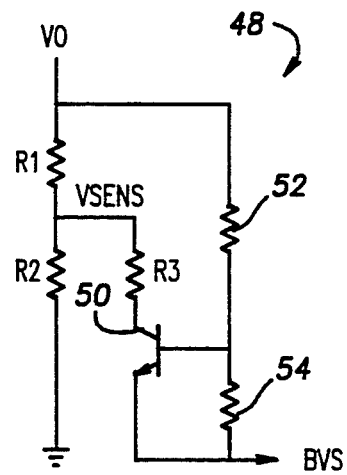

FIG. 3 shows another automatic battery voltage selection circuit 48 which could be used in the AC adapter 20. Again, the resisters R1 and R2 are not part of the circuit 48 and are still coupled in series between the VO signal and ground. One side of the resister R3 is coupled to the VSENS signal. In the automatic battery voltage selection circuit 48, however, the other side of the resister R3 is coupled to the collector of a bipolar transistor 50 having an emitter terminal connected to the BVS signal. The base terminal of the transistor 50 is coupled to one side of a resister 52 and the other side of the resister 52 is connected to the VO signal. A resistor 54 is coupled between the base terminal of the transistor 50 and the BVS signal.

The operation of the automatic battery voltage selection circuit 48 operates in a similar manner as the circuits previously discussed. Thus, if the BVS signal is open circuited, the transistor 50 is biased off, thereby effectively removing the effects of the resisters R3, 52 and 54 as well as the transistor 50, so that the AC adapter 20 regulates the VO signal at the voltage level VO1. Further, the BVS signal is grounded when the battery pack 38 is installed, so that the transistor 50 is biased on thereby essentially placing the resister R3 in parallel with the resister R2 to regulate the VO signal at approximately the voltage level VO2.

Figure 4A:
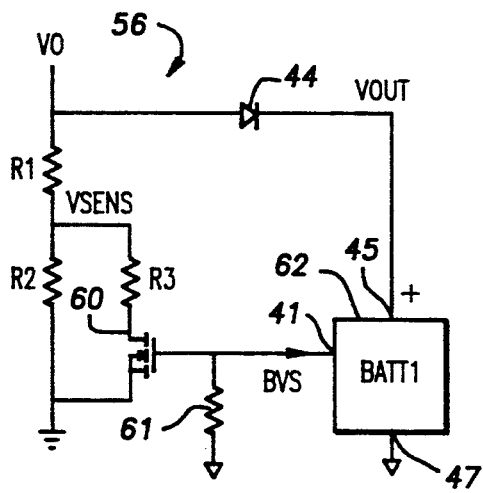
FIGS. 4A and 4B are schematic diagrams of an alternative embodiment of an automatic battery voltage selection circuit according to the present invention shown connected to alternative battery packs.
Figure 4B:
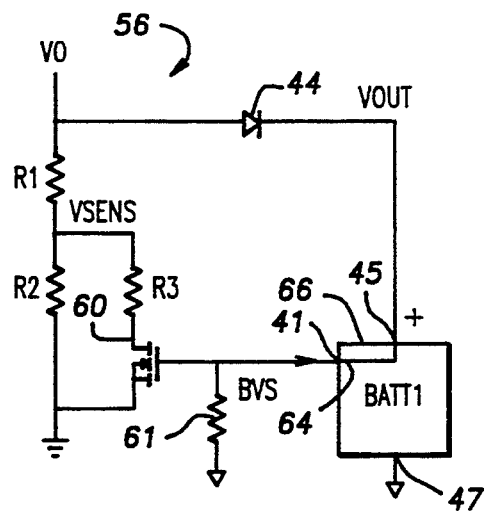

FIGS. 4A and 4B illustrate a different embodiment of an automatic battery voltage selection circuit 56 which could still be used in the AC adapter 20, although using modified battery packs. The terminals 41, 45 and 47 are still used but the terminal 43 is not necessary. Either a battery pack 62 or a battery pack 66 is removably connected to the circuit 56 in a similar manner as described above for the battery packs 34 and 38. The battery packs 62 and 66 preferably have the same nominal voltage levels, respectively, as the battery packs 34 and 38. Referring now to FIG. 4A, the automatic battery voltage selection circuit 56 is also coupled to the resisters R1 and R2 which are coupled in series between the VO signal and ground. The resister R3 again has one side connected to the VSENS signal. The other side of the resister R3 is coupled to the drain terminal of an n-channel MOSFET 60, which has its source terminal connected to ground. The gate terminal of the MOSFET 60 is connected to the BVS signal and a pulldown resistor 61 is connected between the BVS signal and ground. The battery pack 62 does not include a corresponding terminal for the terminal 41, so that the BVS signal is pulled to ground through the resistor 61. The battery pack 62 is again connected between the VOUT signal and ground. In this manner, the MOSFET 60 is switched off, thereby removing the effects of the resister R3, so that the AC adapter 20 again regulates the VO signal at the voltage level VO1.

Referring now to FIG. 4B, the automatic battery voltage selection circuit 56 is shown coupled to a different battery pack 66. The battery pack 66 has a higher voltage level which requires the AC adapter 20 to regulate its output voltage at the voltage level VO2. The battery pack 66 thus includes a jumper 64 which is conductively connected to the positive terminal of the battery pack 66 and to a corresponding location to connect to the terminal 41 when the battery pack 66 is installed. Thus, the BVS signal is coupled through the terminals 41 and 45 and the jumper 64 to the VOUT signal. Again, the jumper 64 may be implemented in any manner as long as it conductively connects the BVS and VOUT signals together. The MOSFET 60 is turned on so that the resistor R3 is essentially placed in parallel with the resistor R2, ignoring the relatively small voltage drop across the diode 44, so that the VO signal is regulated at the voltage level VO2. The resistance of the resistor R3 may be slightly modified to account for the effects of the diode 44.

Figure 5A:
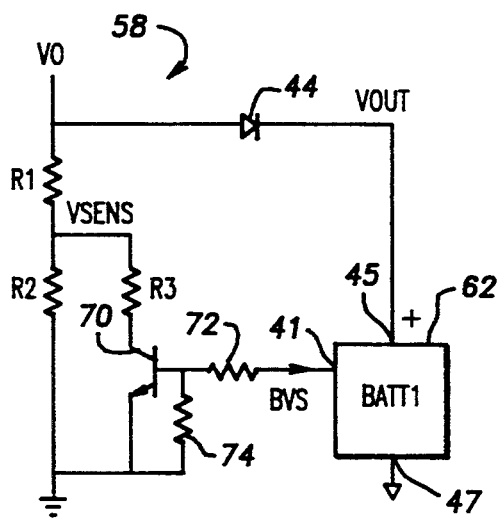
FIGS. 5A and 5B are schematic diagrams of another alternative embodiment of an automatic battery voltage selection circuit according to the present invention using the alternative battery packs of FIGS. 4A and 4B.
Figure 5B:
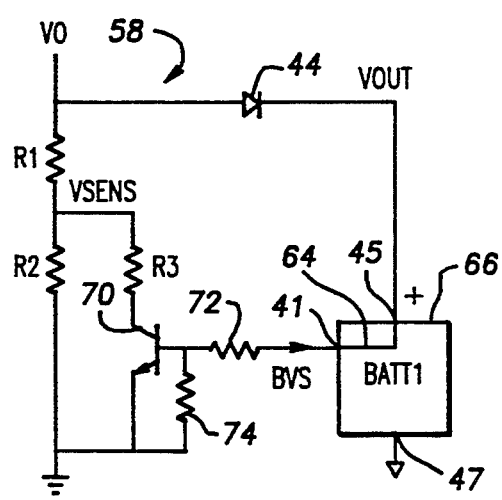

Referring now to FIG. 5A, yet another embodiment of an automatic battery voltage selection circuit 58 is shown which operates similarly to the circuit shown in FIGS. 4A and 4B. Again, the resisters R1, R2 and R3 are coupled in a similar manner except that the second side of the resister R3 is connected to the collector terminal of a bipolar transistor 70 which has its emitter terminal coupled to ground. The base terminal of the transistor 70 is coupled to one side of a resister 72 and to one side of a resister 74 where the other side of the resister 74 is coupled to ground and the other side of the resister 72 is the BVS signal. If the battery pack 62 is installed, the BVS signal is open circuited so that the transistor 70 is biased off and the AC adapter 20 regulates the VO signal at the voltage level VO1. If the battery pack 66 is installed as shown in FIG. 5B, the BVS signal is coupled through the terminals 41 and 45 to the VOUT signal through the jumper 64. Thus, the transistor 70 is biased fully on so that the resistor R3 is placed effectively in parallel with the resistor R2 and the AC adapter regulates the VO signal at VO2.

In all of the embodiments described above, it is noted that the BVS signal is either grounded or open circuited, or pulled high or open circuited, depending upon which battery pack is installed. Another embodiment of the battery pack 62 is contemplated instead of those shown in FIGS. 4A, 4B, 5A and 5B. Instead of using the resistor 61 in FIGS. 4A and 4B, and instead of leaving the BVS signal open circuited, a different jumper such as the jumper 40 in the battery pack 62 could couple the BVS signal to ground through an additional terminal, such as the terminal 43, so that the circuits 56 and 58 would operate in a similar manner by turning off the MOSFET 60 or the transistor 70, respectively.

In the embodiments above, it is noted that the resistor R3 is switched in and out of being in parallel with the resistor R2, which is the lower resistor in the voltage divider used to sense the VO signal. Still another alternative embodiment is contemplated where the switched resistor similar to the resistor R3 is switched in and out of being in parallel with the upper resistor similar to the resistor R1. The resistance values should be modified, however, to maintain the same voltage levels VO1 and VO2 and to maintain similar series resistances. The battery pack voltage levels should also be switched, so that the jumper 64 is located on the battery pack having the lower voltage level corresponding to VO1, whereas the battery pack corresponding to VO2 would not have the jumper 64.

Figure 6:
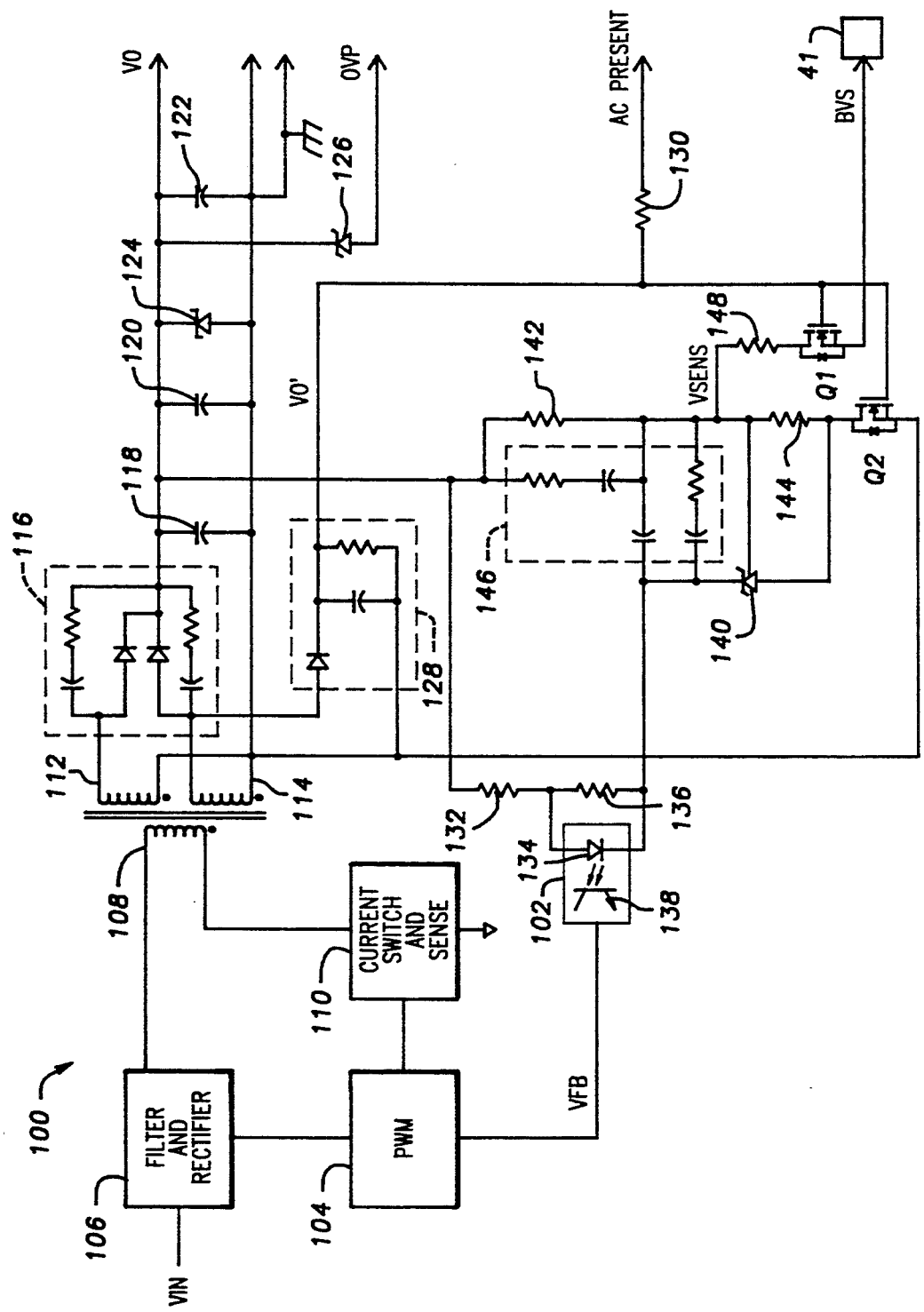
FIG. 6 is a partial block and partial schematic diagram of an AC adapter including another alternative embodiment of an automatic battery voltage selection circuit according to the present invention.

Referring now to FIG. 6, a partial schematic and partial block diagram of an AC adapter 100 connected to another automatic battery voltage selection circuit according to the present invention is shown. It is contemplated that the AC adapter 100 operates with the battery packs 34 and 38 so that the BVS signal is either open circuited or grounded, although it is understood that slight modifications could be made for use with either the battery packs 62 and 66 or 82 and 86. The primary and secondary portions of the AC adapter 100 are preferably isolated from each other through a transformer T1 used to transfer power from the primary to the secondary, and also through an opto-coupler 102 used in a feedback loop to control the transfer of power. A transistor 138 within the opto-coupler 102 is biased to provide a signal VFB to control the output voltage of the AC adapter 100, which again will be referred to as the VO signal.

The particular aspects of the primary side of the AC adapter 100 is less important for purposes of this disclosure and thus is only shown in block diagram form. The AC input voltage, again referred to as the signal VIN, is provided to a filter and rectifier circuit 106 which places an unregulated DC voltage on one side of a primary coil 108 of the transformer T1. A current switch and sense circuit 110 coupled to the other side of the primary coil 108 allows current to pass from the unregulated DC voltage through the primary coil 108 as controlled by a PWM circuit 104, where the PWM 104 is connected to the current switch and sense circuit 110. The PWM circuit 104 receives power from the VIN signal through the filter and rectifier circuit 106.

Two secondary coils 112 and 114 are used in the secondary of the transformer T1 where corresponding positive terminals of each of coils 112 and 114 are provided to a rectifier and filter circuit 116 which has an output providing the VO signal. The other terminals of the coils 112 and 114 are connected to ground and three filter capacitors 118, 120 and 122 are coupled between the VO signal and ground to filter the VO signal. A Zener diode 124 has its anode connected to ground and its cathode connected to the VO signal and is used for overvoltage protection purposes. Another Zener diode 126 has its anode connected to a signal referred to as OVP and its cathode connected to the VO signal, where the OVP signal is used by external circuitry which may be included in the electrical device 42, to detect an overvoltage condition of the AC adapter 100. Another filter and rectifier circuit 128 is connected across the terminals of the secondary coil 114 to provide a signal VO' which is used in the feedback circuit and to provide signals to detect the condition and status of the AC adapter 100. The VO' signal generally develops the same voltage level as the VO signal.

The VO' signal is connected to one side of a resister 130 and the other side of the resister 130 provides a signal AC PRESENT. The AC PRESENT signal is used to detect whether the VIN signal is connected and providing power to the electronic device 42, or whether the electronic device 42 is being powered by one of the battery packs 34 or 38.

The feedback circuit of the AC adapter 100 includes a resister 132 which is coupled between the VO signal and the anode of a light emitting diode (LED) 134 which is internal to the opto-coupler 102. The anode of the LED 134 is also connected to one side of a resister 136 and the cathode of the LED 134 is connected to the other side of the resister 136. The voltage across the resister 136 determines the current through the LED 134 which is used to provide a light signal to the base of the transistor 138, so that the VFB signal is proportional to the light signal. Further details of this feedback circuit in the primary of the AC adapter 100 are not described since they are generally known to those skilled in the art.

The cathode of the LED 134 is also connected to the cathode of an adjustable precision Zener shunt regulator 140, which is preferably an AS 431 manufactured by Astec Semiconductor. The anode of the shunt regulator 140 is connected to the drain terminal of a n-channel enhancement MOSFET Q2, which has its source terminal connected to ground and its gate terminal connected to the VO' signal. One side of a resister 144 is connected to the anode of the shunt regulator 140 and the other side of the resistor 144 is connected to a reference terminal of the shunt regulator 140. The reference terminal of the shunt regulator 140 is a signal referred to as VSENS, which is analogous to the VSENS signal in the embodiments described previously. The VSENS signal is connected to one side of a resister 142 and the other side of the resister 142 is connected to the VO signal.

An RC compensation network 146 is connected between the VO signal, the cathode of the shunt regulator 140 and the VSENS signal, where the RC network 146 is used for loop compensation purposes of the AC adapter 100 as generally known to those skilled in the art. The VSENS signal is also connected to one side of a resistor 148 and the other side of the resistor 148 is connected to the drain terminal of an n-channel enhancement MOSFET Q1. The gate terminal of the MOSFET Q1 is connected to the VO' signal and its source terminal is connected to a signal BVS which is also analogous to the BVS signal in the embodiments discussed above. Thus, the BVS signal is open circuited or grounded, respectively, depending upon whether the battery pack 34 or the battery pack 38 is installed in the AC adapter 100. The resistors 142, 144 and 148 are analogous to the resistors R1, R2 and R3 and are used in a similar manner to control the level of the VO signal as determined by the BVS signal. One difference between the AC adapter 100 and the AC adapter 20 described previously is that the AC adapter 100 includes a separate loop providing the VO' signal which provides power for the feedback circuit. The VO' signal also allows development of the AC PRESENT signal used to detect whether the VIN signal is being provided.

The operation of the AC adapter 100 will now be described. When the VIN signal is not connected to the AC adapter 100, the VO signal is determined by the battery pack 34 or the battery pack 38 if installed, and the VO' signal remains essentially open circuited. When the VO' signal is open circuited, the MOSFET Q2 is switched off since the AC adapter 100 is effectively inoperative. The battery pack 34 or 38 is thus isolated from the AC adapter 100 so that it does not consume valuable battery power. When the VIN signal is connected to the AC adapter 100, a voltage develops at the VO and VO' signals, turning on the MOSFET Q2, effectively grounding the anode of the shunt regulator 140. The shunt regulator 140 operates in a similar manner as a comparator due to an internal reference voltage which is preferably 2.5 volts. The shunt regulator 140 operates to keep the VSENS signal at 2.5 volts by controlling current through its cathode and anode. If the battery pack 34 is connected to the AC adapter 100, the BVS signal is essentially open circuited, thereby eliminating the effects of the MOSFET Q1 and the resistor 148. In this case, the resistors 142 and 144 establish a voltage divider used to sense the VO signal and to provide the VSENS signal so that the VO signal is preferably regulated at the voltage level VO1.

When the battery pack 38 is connected to the AC adapter 100, the BVS signal is grounded through the terminal 41, thereby turning on the MOSFET Q1, essentially grounding the second side of the resistor 148 placing it in parallel with the resistor 144. This effectively lowers the resistance between the VSENS signal and ground, thereby temporarily lowering the voltage of the VSENS signal. The shunt regulator 140 responds by increasing the current through the resistor 136 to increase the voltage level of the VFB signal. The AC adapter 100 increases the voltage level of the VO signal until the VSENS signal approximately equals the reference voltage of the shunt regulator 140. In this manner, when the battery pack 38 is connected to the AC adapter 100, thereby grounding BVS signal, the AC adapter 100 regulates the VO signal to a second level which is preferably the voltage level VO2. It is noted that the resistor 148 is analogous to the resistor R3 having one side coupled to the VSENS signal and the other side either open circuited or essentially grounded depending upon which battery is installed.

Figure 7:
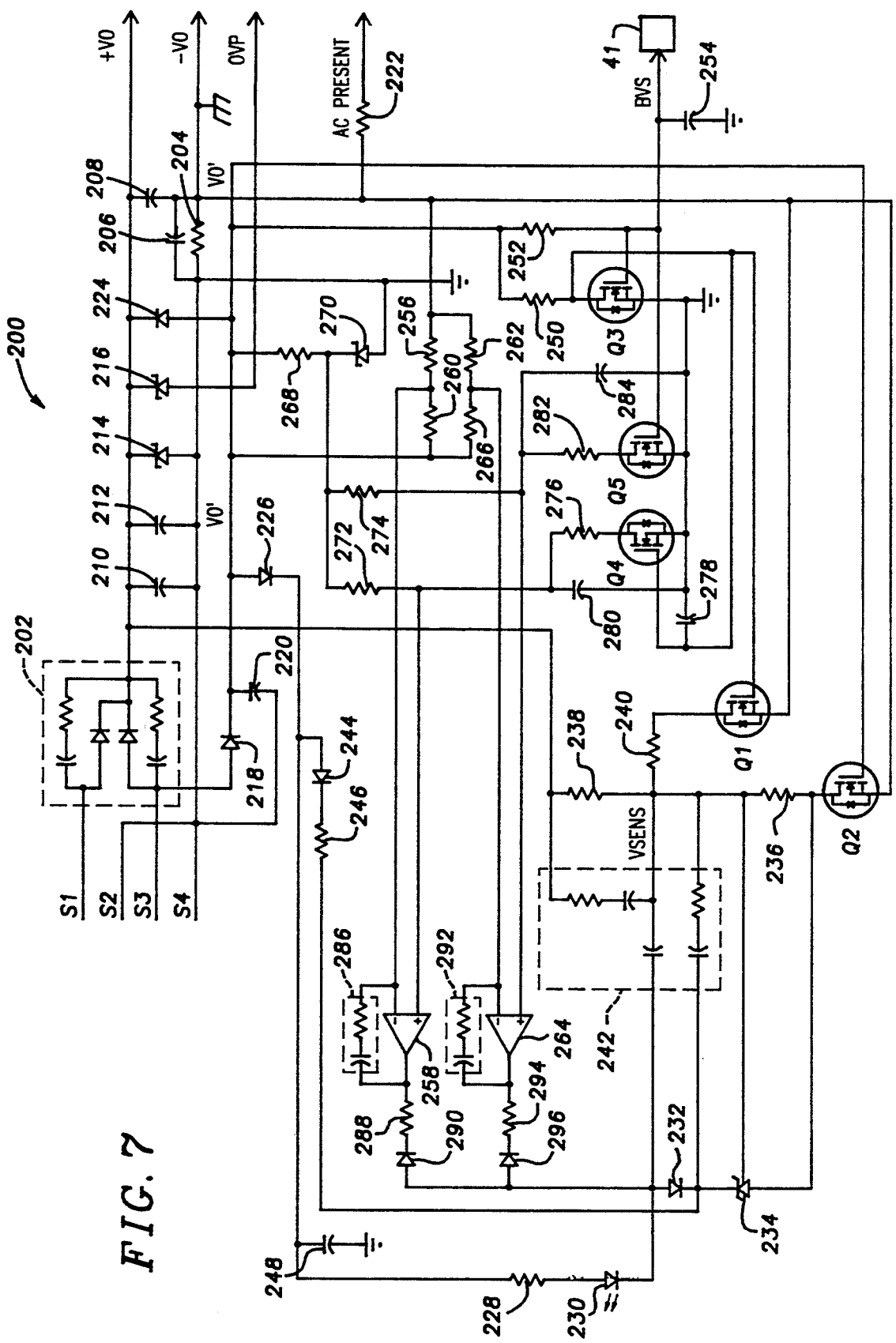
FIG. 7 is a schematic diagram of the secondary portion of an AC adapter including yet another embodiment of an automatic battery voltage selection circuit according to the present invention.

Referring now to FIG. 7, the secondary circuit of an AC adapter 200 is shown which is similar in operation to the AC adapter 100, although slightly more complicated. The primary side of the AC adapter 200 is not shown in FIG. 7, although it is essentially very similar to the primary side of the AC adapter 100. A first coil (not shown) has two terminals S1 and S2 and a second coil has two terminals S3 and S4 where the corresponding terminals S1 and S3 are connected to a filter and rectification circuit 202 which provides the VO signal. The filter and rectification circuit 202 operates in a similar manner as the filter and rectification circuit 116. The corresponding terminals S2 and S4 are connected together and will generally be referred to as ground. An output current sense resistor 204 is connected between ground and a signal −VO, which is the return or reference signal for the VO signal. A filter capacitor 206 is connected between the −VO signal and ground to filter the resistor 204 and an output filter capacitor 208 is connected between the VO signal and the −VO signal. Filter capacitors 210 and 212 are connected between the VO signal and ground and an overvoltage protection diode 214 has its anode connected to ground and its cathode connected to the VO signal. A Zener diode 216 has its anode connected to a signal OVP and its cathode connected to the VO signal, where the Zener diode 216 provides the OVP signal to external circuitry to detect an overvoltage condition of the AC adapter 200.

The S3 terminal is also connected to the anode of a rectifier diode 218 which has its cathode connected to the VO' signal. A filter capacitor 220 is connected between the VO' signal and ground. The VO' signal is connected to one side of a resistor 222 and the other side of the resistor 222 provides a signal referred to as AC PRESENT which operates in analogous manner as the AC PRESENT signal of the AC adaptor 100. A reverse voltage protection diode 224 has its anode connected to the VO' signal and its cathode connected to the VO signal.

The VO' signal is connected to the anode of a diode 226 which has its cathode connected to one side of a current limiter resistor 228. The other side of the resistor 228 is connected to the anode of an LED 230, which operates in a similar manner as the LED 134, preferably being internal to an opto-coupler (not shown). The cathode of the LED 230 is connected to the anode of a diode 232, which has its cathode connected to the cathode of an adjustable precision Zener shunt regulator 234. The shunt regulator 234 operates in a similar manner and is preferably the same type of shunt regulator as the shunt regulator 140. The anode of the shunt regulator 234 is connected to the drain terminal of an n-channel enhancement MOSFET Q2 which operates in a similar manner as the MOSFET Q2 of the AC adapter 100. The source terminal of the MOSFET Q2 is connected to the −VO signal and its gate terminal is connected to the VO' signal. The reference terminal of the shunt regulator 234 is a signal referred to as VSENS which is analogous to the VSENS signal of the AC adapter 100. The VSENS signal is connected to one side of a resistor 236 and the other side of the resistor 236 is connected to the drain terminal of the MOSFET Q2. The VSENS signal is connected to one side of a resistor 238 and the other side of the resistor 238 is connected to the VO signal. The VSENS signal is also connected to one side of a resistor 240 and the other end of the resistor 240 is connected to the source terminal of an n-channel enhancement MOSFET Q1 which has its drain terminal connected the −VO signal. As will be more fully described below, the resistors 238, 236 and 240 are analogous to the resistors R1, R2 and R3, which are further analogous to the resistors 142, 144 and 148 in the AC adapter 100.

The gate terminal of the MOSFET Q1 is connected to a signal referred to as BVS' which will be described in more detail below. An RC compensation network 242 is connected between the VO signal, the cathode of the shunt regulator 234 and the VSENS signal which operates in a similar manner as the RC compensation network 146 for the AC adapter 100. The cathode of the diode 226 is also connected to the anode of a diode 244, which has its cathode connected to one side of a resistor 246. The other side of the resistor 246 is connected to the cathode of the shunt regulator 234, so that the diode 244 and the resistor 246 provide power from the VO' signal to the shunt regulator 234. A filter capacitor 248 is coupled between the cathode of the diode 226 and ground.

The VO' signal is further connected to one side of a resistor 250 and to one side of a resistor 252. The other side of the resistor 250 is the BVS' signal, which is connected to the drain terminal of an n-channel enhancement MOSFET Q3. The other side of the resistor 252 is a signal referred to as BVS, which is analogous to the BVS signal of the adapter 100. The BVS signal is connected to the gate terminal of the MOSFET Q3 and the source terminal of the MOSFET Q3 is connected to ground. A filter capacitor 254 is connected between the BVS signal and ground.

The −VO signal is further connected to one side of a resistor 256 and the other side of the resistor 256 is connected to the inverting terminal of a comparator 258. The inverting terminal of the comparator 258 is also connected to one side of a resistor 260 and the other side of the resistor 260 is connected to the VO' signal. The −VO signal is also connected to one side of a resistor 262 and the other side of the resistor 262 is connected to the inverting terminal of another comparator 264. The inverting terminal of the comparator 264 is further connected to one side of a resistor 266 and the other side of the resistor 266 is connected to the VO' signal.

The VO' signal is connected to one side of a resistor 268, the other side of the resistor 268 is connected to the cathode of a Zener diode 270 and the anode of the Zener diode 270 is connected to ground. The cathode of the Zener diode 270 is connected to one side of two resistors 272 and 274 where the other side of the resistor 272 is connected to the non-inverting terminal of the comparator 258 and the other side of the resistor 274 is connected to the non-inverting terminal of the comparator 264. The non-inverting terminal of the comparator 258 is also connected to one side of a resistor 276 and the other side of the resistor 276 is connected to the drain terminal of an n-channel enhancement MOSFET Q4. The gate terminal of the MOSFET Q4 is connected to the BVS' signal and its source terminal is connected to ground.

A filter capacitor 278 is connected between ground and the BVS' signal. Another filter capacitor 280 is connected between the non-inverting terminal of the comparator 258 and ground. The non-inverting terminal of the comparator 264 is connected to one side of a resistor 282 and the other side of the resistor 282 is connected to the drain terminal of an n-channel enhancement MOSFET Q5. The gate terminal of the MOSFET Q5 is connected to the BVS signal and its source terminal is connected to ground. A filter capacitor 284 is connected between the non-inverting terminal of the comparator 264 and ground.

An RC feedback circuit 286 is connected between the inverting terminal and the output of the comparator 258 and the output is also connected to one side of a resistor 288. The other side of the resistor 288 is connected to the cathode of a diode 290 and the anode of the diode 290 is connected to the cathode of the LED 230. Similarly, an RC feedback circuit 292 is connected between the inverting input and the output of the comparator 264 and the output of the comparator 264 is connected to one side of a resistor 294. The other side of the resistor 294 is connected to the cathode of a diode 296 and the anode of the cathode 296 is connected to the cathode of the LED 230.

The operation of the secondary of the AC adapter 200 will now be described. If the VIN signal is not applied to the primary side of the AC adapter 200, the AC adapter 200 is effectively disabled and the VO signal is controlled by a battery connected between it and −VO signal. The VO' signal is essentially open circuited. In this case, the MOSFET Q2 is turned off, allowing no current through the LED 230. Thus, a battery coupled to the VO signal determines the voltage level of the VO signal and is isolated from the AC adapter 200. If the VIN signal is connected to the primary side of the AC adapter 200, a voltage develops between the VO signal and the −VO signal and a similar voltage develops between the VO' signal and ground so that the MOSFET Q2 is switched on, allowing feedback current to flow through the LED 230 as controlled by the comparators 258, 264 and the shunt regulator 234. The shunt regulator 234 operates to establish the voltage level of the VO signal as determined by the voltage divider comprising the resistors 238 and 236, and also the resistor 240 depending upon the status of the BVS signal. When the battery pack 34 is connected to the AC adapter 200 providing an open circuit connection to the BVS signal, the BVS signal is pulled up through the resistor 252 to the level of the VO' signal turning on the MOSFET Q3, effectively grounding the BVS' signal. If the MOSFET Q3 is turned on, the MOSFET Q1 is turned off so that the resistor 240 is switched out of the AC adapter 200 and has little or no effect on its operation. Thus, the output voltage at the VO signal of the AC adapter 200 is preferably regulated at the voltage level VO1.

If the battery pack 38 is connected to the AC adapter 200, the BVS signal is grounded through the terminal 41, thereby disabling or turning off the MOSFET Q3. The BVS' signal is pulled high through the resistor 250 to the level of the VO' signal, thereby turning on the MOSFET Q1. Thus, the resistor 240 is effectively coupled in parallel with the resistor 236, thereby tending to lower the voltage level of the VSENS signal. In an analogous manner as described for the AC adapter 100, the shunt regulator 234 increases the current through the LED 230 so that the primary side of the AC adapter 200 responds by increasing the VO signal to a second voltage level which is preferably the voltage level VO2.

In summary, therefore, if the battery pack 34 is connected to the AC adapter 200, the VO signal is regulated at the first voltage level VO1, and if the battery pack 38 is connected to the AC adapter 200, the VO signal is regulated at the second voltage level VO2. Note again that the resistor 240 has one side connected to the VSENS signal and the other side either open circuited or essentially grounded depending upon which battery pack is installed.

The AC adapter 200 is preferably designed to provide a constant amount of power between the VO and $-$VO signals to charge either battery pack 34 or 38 and to provide power to the electronic device 42. The constant power level is preferably approximately 32 watts which is greater than the maximum power requirements of the electronic device 42. Most of the remaining power not used by the electronic device 42 is provided to charge the battery pack. Briefly, the AC adapter 200 preferably operates with a maximum power regulated characteristic comprising a constant switching frequency flyback DC-DC converter with a discontinuous inductor current through the primary inductance of a power transformer so that the peak inductor current is limited to a maximum value. If the constant frequency is f, the inductance of the primary inductance is L and the peak current through the primary inductance is i, then the energy stored, and thus transferred to the output of the AC adapter 200, is $\frac{1}{2} Li^2$ and the power level at the output is $\frac{1}{2} Li^2 f$. The values of f, i and L are chosen to provide the desirable power level. For more details on the constant power technique, please see copending application Ser. No. 701,657, entitled "Maximum Power Regulated Battery Charger" to Kris P. Dehnel, which is hereby incorporated by reference.

The comparators 258 and 264 provide two separate current control feedback loops, only one of which is activated at a time depending upon which of the battery packs 34 or 38 is installed. Each current control monitors the output current of the AC adapter so that the AC adapter 200 provides a constant power output between the VO and the $-$VO signals. If the battery pack 34 is connected to the AC adapter 200, the MOSFET Q3 and the MOSFET Q5 are switched on, whereas the MOSFETs Q1 and Q4 are switched off. In this case, the comparator 264 thus controls the output current of the AC adapter 200 and the feedback controlled by the comparator 258 is effectively disabled. The comparator 264 senses the output current through the voltage developed across the resistor 204 through the voltage divider comprising the resistors 262 and 266 where the signal at the junction of the resistors 262 and 266 is provided to the inverting terminal of the comparator 264. A reference voltage is established at the non-inverting terminal of the comparator 264 through the voltage divider comprising the resistors 268, 274 and 282 to regulate the output power at a level which is preferably between 29 and 35 watts, having a nominal level of 32 watts.

Alternatively, if the battery pack 38 is connected to the AC adapter 200, the MOSFETs Q3 and Q5 are turned off and the MOSFETs Q1 and Q4 are turned on, so that the VO signal is regulated at the higher voltage level VO2 and the output current is regulated by the comparator 258 to maintain the output power of the AC adapter 200 at a constant power of preferably between 29 and 35 watts. The nominal level of the output power is again preferably 32 watts. Since the MOSFET Q5 is turned off in this case, the comparator 264 is effectively disabled. The comparator 258 senses the output current through the resistor 204 by detecting the voltage across the resistor 204 through the voltage divider comprising the resistors 256 and 260. The junction between the resistors 256 and 260 provides a sense voltage at the inverting input of the comparator 258 which is compared to a reference voltage provided at its non-inverting terminal provided by the voltage divider comprising the resistors 268, 272 and 276.

In summary, an AC adapter including an automatic battery voltage detection circuit according to the present invention allows two separate battery packs to be installed in an electronic device, and to be charged by an AC adapter. Only a single feedback loop is needed. An output voltage sensor senses the level of the output voltage and provides a sense signal appropriate to regulate the AC adapter at a voltage level appropriate for a first battery pack. A battery voltage selection signal providing means provides the BVS signal indicative of which battery pack is installed. A switching circuit, preferably including a resistor and a transistor switching circuit, receives the BVS signal and controls the sense signal to a level so that the output of the AC adapter is regulated at a level appropriate for whichever battery pack is present or installed in the electronic device.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

I claim:

1. An AC adapter for charging a first battery pack if the first battery pack is present, and for charging a second battery pack if the second battery pack is present, the first and second battery packs having different voltages, said AC adapter comprising:

means having a sense input and an output for supplying power at said output, wherein the voltage level of said output is regulated by a sense signal provided at said sense input;

means coupled to said power supplying means for sensing the voltage level of said output and for providing said sense signal at a level so that said power supplying means regulates said output to a first voltage level appropriate for charging the first battery pack;

switching means coupled to said sense input and having a battery selection signal input for receiving a battery selection signal, wherein if said battery selection signal indicates that the second battery pack is present, said switching means modifies the level of said sense signal so that said power supplying means regulates said output to a second voltage level appropriate for charging the second battery pack; and means coupled to said switching means and having a battery indicating input, said means for providing said battery selection signal, wherein said battery selection signal is set to a predetermined voltage level indicative of the second battery pack being present if said battery indicating input is connected to a predetermined voltage level and wherein said battery selection signal is not provided if said battery indicating input is unconnected.

2. The AC adapter of claim 1, wherein said sensing means comprises a resistive voltage divider having a junction for providing said sense signal.

3. The AC adapter of claim 1, wherein if the first battery pack is present, said battery indicating input is unconnected and if the second battery pack is present, said battery indicating input is grounded.

4. The AC adapter of claim 1, wherein the second battery pack includes a conductive jumper having two terminals, and wherein said battery selection signal providing means comprises:

a first terminal providing said battery selection signal and for coupling to one terminal of the conductive jumper and a second terminal coupled to ground and for coupling to the other terminal of the conductive jumper, wherein if the second battery pack is present, the conductive jumper connects said first and second terminals of said battery selection signal providing means.

5. The AC adapter of claim 1, wherein the second battery pack includes a conductive jumper having a first terminal and a second terminal, wherein the second terminal is connected to the positive terminal of the second battery pack for coupling to said power supplying means output when the second battery pack is present, and wherein said battery selection signal providing means comprises:

a terminal providing said battery selection signal and for coupling to the first terminal of the conductive jumper, wherein if the second battery pack is present, the conductive jumper connects said battery selection signal providing means terminal to said power supplying means output.

6. The AC adapter of claim 5, further comprising:

a pulldown resistor coupled between said battery selection signal providing means terminal and ground, wherein said battery indicating input is grounded through said pulldown resistor if the first battery pack is present.

7. The AC adapter of claim 1, wherein said switching means includes a resistor.

8. The AC adapter of claim 7, wherein said resistor is coupled to said sense input and receives said battery selection signal.

9. The AC adapter of claim 1, wherein said switching means comprises a transistor switching circuit coupled to said power supplying means output.

10. The AC adapter of claim 9, wherein said transistor circuit is activated off unless said battery selection signal is at said predetermined voltage level, wherein said transistor switching circuit is activated on.

11. The AC adapter of claim 10, wherein said switching means further comprises a resistor having a first terminal coupled to said sense input and a second terminal coupled to said transistor switching circuit, wherein if said transistor switching circuit is activated off, said second terminal of said resistor is open circuited, and wherein if said switching circuit is activated on, said second terminal of said resistor is grounded through said transistor circuit.

12. The AC adapter of claim 11, wherein said transistor circuit further comprises:

a MOSFET transistor having its drain terminal coupled to said second terminal of said resistor, its source terminal coupled to said battery selection signal providing means, and its gate terminal coupled to said power supplying means output.

13. The AC adapter of claim 11, wherein said transistor circuit further comprises:

a voltage divider coupled between said power supplying means output and said battery selection signal providing means, said voltage divider having junction; and a bipolar transistor having its collector terminal coupled to said second terminal of said resistor, its emitter terminal coupled to said battery selection signal providing means, said its base terminal coupled to said voltage divider junction.

14. The AC adapter of claim 1, wherein said switching means comprises a transistor switching circuit coupled to ground.

15. The AC adapter of claim 14, wherein said transistor circuit is activated off unless said battery selection signal is at said predetermined voltage level, wherein said transistor switching circuit is activated on.

16. The AC adapter of claim 14, wherein said switching means further comprises a resistor having a first terminal coupled to said sense input and a second terminal coupled to said transistor switching circuit, wherein if said transistor switching circuit is activated off, said second terminal of said resistor is open circuited, and wherein if said switching circuit is activated on, said second terminal of said resistor is grounded through said transistor circuit.

17. The AC adapter of claim 16, wherein said transistor circuit further comprises:

a MOSFET transistor having its drain terminal coupled to said second terminal of said resistor, its gate terminal receiving said battery selection signal, and its source terminal coupled to ground.

18. The AC adapter of claim 16, wherein said transistor circuit further comprises:

a voltage divider coupled to ground and receiving said battery selection signal, and having a junction; and a bipolar transistor having its collector terminal coupled to said second terminal of said resistor, its emitter terminal coupled to ground, and its base terminal coupled to said voltage divider junction.

19. The AC adapter of claim 1, wherein said AC adapter is connected to an AC source and wherein said power supplying means further includes:

a transformer having a primary and a secondary;

a primary filter and rectifier circuit coupled to the AC source and said transformer primary for providing a DC voltage to said transformer primary;

a pulse width modulation circuit receiving power from said primary filter and rectification circuit, said pulse width modulation circuit having an input and an output wherein said pulse width modulation circuit output is coupled to said transformer primary for controlling the current through said transformer primary depending upon said pulse width modulation circuit input;

an opto coupler coupled to said pulse width modulation circuit, said opto coupler receiving said sense signal and providing a corresponding feedback signal to said pulse width modulation circuit input; and a secondary filter and rectification circuit coupled to said transformer secondary for providing said power supplying means output.

20. The AC adapter of claim 19, further comprising:
means coupled to said transformer secondary for sensing the output current of said power supplying means output;

a first current control means coupled to said current sensing means, said switching means and said sense input for modifying said sense signal so that said power supplying means regulates said power supplying means output to said first voltage level and at a current level necessary to maintain said power supplying means output at a predetermined constant power level;

a second current control means coupled to said sensing means, said switching means and said sense input, wherein if said battery selection signal is at said predetermined voltage level indicative of the second battery pack being present, said switching means disables said first current control means and enables said second current control means and wherein said second current control means modifies said sense signal so that said power supplying means regulates said power supplying means output to said second voltage level and at a current level necessary to maintain the power supplying means output at said predetermined constant power level.

21. An AC adapter for charging a first battery pack if the first battery pack is present, and for charging a second battery pack if the second battery pack is present, said AC adapter comprising:

means having a sense input and an output for supplying power at said output appropriate for charging the first or second battery packs, wherein said output is regulated by a sense signal provided at said sense input;

switching means coupled to said sense input and having a battery selection signal input for receiving a battery selection signal, wherein said switching means provides said sense signal to regulate said output appropriate for charging the first or second battery pack depending upon said battery selection signal; and means coupled to said switching means for providing said battery selection signal, wherein said battery selection signal input is unconnected when the first battery pack is present, and wherein said battery selection signal input is connected to said battery selection signal providing means and said battery selection signal is set to a predetermined voltage level when the second battery pack is present.

22. The AC adapter of claim 21, wherein if the first battery pack is present, said battery selection signal input is unconnected and if the second battery pack is present, said battery selection signal input is grounded.

23. The AC adapter of claim 21, wherein said predetermined voltage level is ground.

24. The AC adapter of claim 21, wherein said predetermined voltage level is the voltage level of the second battery.

25. The AC adapter of claim 21, wherein the second battery pack includes a conductive jumper having two terminals, and wherein said battery selection signal providing means comprises:

a first terminal providing said battery selection signal and for coupling to one terminal of the conductive jumper and a second terminal coupled to ground and for coupling to the other terminal of the conductive jumper, wherein if the second battery pack is present, the conductive jumper connects said first and second terminals of said battery selection signal providing means.

26. The AC adapter of claim 21, wherein the second battery pack includes a conductive jumper having a first terminal and a second terminal, wherein the second terminal is connected to the positive terminal of the second battery pack for coupling to said power supplying means output when the second battery pack is present, and wherein said battery selection signal providing means comprises:

a terminal providing said battery selection signal and for coupling to the first terminal of the conductive jumper, wherein if the second battery pack is present, the conductive jumper connects said battery selection signal providing means terminal to said power supplying means output.

27. The AC adapter of claim 21, wherein said switching means includes a resistor.

28. The AC adapter of claim 27, wherein said resistor is coupled to said sense input and receives said battery selection signal.

29. The AC adapter of claim 21, wherein said switching means comprises a transistor switching circuit coupled to said power supplying means output.

30. The AC adapter of claim 29, wherein said transistor circuit is activated off unless said battery selection signal is at said predetermined voltage level, wherein said transistor switching circuit is activated on.

31. The AC adapter of claim 30, wherein said switching means further comprises a resistor having a first terminal coupled to said sense input and a second terminal coupled to said transistor switching circuit, wherein if said transistor switching circuit is activated off, said second terminal of said resistor is open circuited, and wherein if said switching circuit is activated on, said second terminal of said resistor is grounded through said transistor circuit.

32. The AC adapter of claim 31, wherein said transistor circuit further comprises:

a MOSFET transistor having its drain terminal coupled to said second terminal of said resistor, its source terminal coupled to said battery selection signal providing means, and its gate terminal coupled to said power supplying means output.

33. The AC adapter of claim 31, wherein said transistor circuit further comprises:

a voltage divider coupled between said power supplying means output and said battery selection signal providing means having a junction; and a bipolar transistor having its collector terminal coupled to said second terminal of said resistor, its emitter terminal coupled to said battery selection signal input, and its base terminal coupled to said voltage divider junction.

34. The AC adapter of claim 21, wherein said switching means comprises a transistor switching circuit coupled to ground.

35. The AC adapter of claim 34, wherein said transistor circuit is activated off unless said battery selection signal is at said predetermined voltage level, wherein said transistor switching circuit is activated on.

36. The AC adapter of claim 34, wherein said switching means further comprises a resistor having a first terminal coupled to said sense input and a second terminal coupled to said transistor switching circuit, wherein if said transistor switching circuit is activated off, said second terminal of said resistor is open circuited, and wherein if said switching circuit is activated on, said second terminal of said resistor is grounded through said transistor circuit.

37. The AC adapter of claim 36, wherein said transistor circuit further comprises:
- a voltage divider coupled to ground and receiving said battery selection signal, and having a junction; and
- a bipolar transistor having its collector terminal coupled to said second terminal of said resistor, its emitter terminal coupled to ground, and its base terminal coupled to said voltage divider junction.

38. The AC adapter of claim 21, wherein said AC adapter is connected to an AC source and wherein said power supplying means further includes:
- a transformer having a primary and a secondary;
- a primary filter and rectifier circuit coupled to the AC source and said transformer primary for providing a DC voltage to said transformer primary;
- a pulse width modulation circuit receiving power from said primary filter and rectification circuit, said pulse width modulation circuit having an input and an output wherein said pulse width modulation circuit output is coupled to said transformer primary for controlling the current through said transformer primary depending upon said input;
- an optocoupler coupled to said pulse width modulation circuit, said optocoupler receiving said sense signal and providing a corresponding feedback signal to said pulse width modulation circuit input; and
- a secondary filter and rectification circuit coupled to said transformer secondary for providing said power supplying means output.

39. The AC adapter of claim 38, further comprising:
- means coupled to said transformer secondary for sensing the output current of said power supplying means output;
- a first current control means coupled to said current sensing means, said switching means and said sense input for modifying said sense signal so that said power supplying means regulates said power supplying means output to said first voltage level and at a current level necessary to maintain said power supplying means output at a predetermined constant power level;
- a second current control means coupled to said sensing means, said switching means and said sense input, wherein if said battery selection signal is at said predetermined voltage level, said switching means disables said first current control means and enables said second current control means and wherein said second current control means modifies said sense signal so that said power supplying means regulates said power supplying means output to said second voltage level and at a current level necessary to maintain the power supplying means output at said predetermined constant power level.

* * * * *

UNITED STATES PATENT AND TRADEMARK OFFICE
CERTIFICATE OF CORRECTION

PATENT NO. : 5,355,073
DATED : October 11, 1994
INVENTOR(S) : Hai N. Nguyen

It is certified that error appears in the above-identified patent and that said Letters Patent is hereby corrected as shown below:

In column 16, line 20, before "junction" please add --a--.

In column 16, line 24, please replace "said" with --and--.

Signed and Sealed this

Twenty-eight Day of February, 1995

Attest:

BRUCE LEHMAN

Attesting Officer     Commissioner of Patents and Trademarks